(12) United States Patent
Drouvot et al.

(10) Patent No.: US 10,006,313 B2
(45) Date of Patent: Jun. 26, 2018

(54) POWER PLANT WITH INTEGRATED FUEL GAS PREHEATING

(71) Applicant: ALSTOM Technology Ltd, Baden (CH)

(72) Inventors: Paul Drouvot, Village-Neuf (FR); François Droux, Oberrohrdorf (CH); Klara Berg, Brugg (CH)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 944 days.

(21) Appl. No.: 14/317,723

(22) Filed: Jun. 27, 2014

(65) Prior Publication Data

US 2015/0007575 A1    Jan. 8, 2015

(30) Foreign Application Priority Data

Jul. 8, 2013    (EP) ...................... 13175484

(51) Int. Cl.
| | |
|---|---|
| *F01K 17/02* | (2006.01) |
| *F02C 7/224* | (2006.01) |
| *F01K 23/10* | (2006.01) |
| *F02C 6/18* | (2006.01) |

(52) U.S. Cl.
CPC ............ *F01K 17/025* (2013.01); *F01K 23/10* (2013.01); *F02C 6/18* (2013.01); *F02C 7/224* (2013.01); *Y02E 20/16* (2013.01)

(58) Field of Classification Search
CPC .......... F01K 17/025; F01K 23/10; F02C 6/18; F02C 7/224; Y02E 20/16
USPC ........................................................ 60/772
See application file for complete search history.

(56) References Cited

U.S. PATENT DOCUMENTS

| | | | |
|---|---|---|---|
| 4,354,347 A | 10/1982 | Tomlinson et al. | |
| 6,269,626 B1 * | 8/2001 | Kim ...................... | F01K 23/106 122/7 B |
| 6,920,760 B2 * | 7/2005 | Schottler .............. | F01K 23/106 60/39.182 |

(Continued)

FOREIGN PATENT DOCUMENTS

| | | |
|---|---|---|
| CN | 102852645 A | 1/2013 |
| DE | 10 2007 054 467 | 5/2009 |

(Continued)

OTHER PUBLICATIONS

Decision to Grant issued in connection with corresponding RU Application No. 2014127721 dated Apr. 18, 2016.

(Continued)

*Primary Examiner* — Jason T Newton (57) ABSTRACT

The invention refers to a CCPP comprising a gas turbine, a water steam cycle with a steam turbine and a HRSG with at least two pressure levels, and a fuel preheater for preheating the fuel of the gas turbine. The fuel preheater includes a first heat exchanger for preheating the fuel to a first elevated temperature, which is connected to a feed water line from a pressure level of the HRSG, which is below the highest HRSG pressure level, and a second heat exchanger for further preheating the fuel gas to a second elevated temperature, which is connected to the high pressure feed water with the highest pressure level of the HRSG. The disclosure further refers to a method for operating a CCPP with such a fuel preheater.

9 Claims, 4 Drawing Sheets

(56) References Cited

U.S. PATENT DOCUMENTS

| | | | |
|---|---|---|---|
| 8,141,367 B2* | 3/2012 | Rancruel | F02C 6/18 60/39.182 |
| 8,528,335 B2* | 9/2013 | Bilton | F02C 9/26 60/39.5 |
| 9,470,145 B2* | 10/2016 | Ball, Jr. | F02C 6/06 |
| 2001/0049934 A1 | 12/2001 | Ranasinghe et al. | |
| 2007/0017207 A1 | 1/2007 | Smith et al. | |
| 2010/0024430 A1 | 2/2010 | Hofmann | |
| 2010/0031660 A1* | 2/2010 | Narayan | F01K 23/106 60/734 |
| 2010/0031933 A1* | 2/2010 | Narayan | F01K 23/10 123/543 |
| 2010/0083661 A1* | 4/2010 | Narayanaswamy | F01K 13/02 60/670 |
| 2010/0287870 A1 | 11/2010 | Sondermann | |
| 2011/0173948 A1* | 7/2011 | Fujita | F02C 6/18 60/39.182 |
| 2012/0317988 A1* | 12/2012 | Gardiner | F02C 6/18 60/772 |
| 2014/0069078 A1* | 3/2014 | Tong | F01K 23/10 60/39.182 |
| 2014/0130476 A1* | 5/2014 | Nakamura | F01K 23/105 60/39.182 |
| 2014/0260310 A1* | 9/2014 | Berlowitz | C01B 3/34 60/780 |
| 2015/0007575 A1* | 1/2015 | Drouvot | F01K 17/025 60/772 |
| 2015/0113939 A1* | 4/2015 | Berg | F01K 17/00 60/39.182 |
| 2017/0167306 A1* | 6/2017 | Scipio | F01K 23/10 |
| 2017/0167307 A1* | 6/2017 | Scipio | F01K 23/10 |

FOREIGN PATENT DOCUMENTS

| | | |
|---|---|---|
| EP | 0 290 220 A1 | 11/1988 |
| EP | 0 931 911 | 7/1999 |
| EP | 1 199 445 | 4/2002 |
| EP | 1921281 A | 5/2008 |
| EP | 2 573 360 A2 | 3/2013 |
| KR | 10-1998-0703510 | 11/1998 |
| KR | 1020010023004 A | 3/2001 |
| SU | 601441 A1 | 4/1978 |
| UA | 27473 U | 10/2007 |
| WO | 96/31685 A1 | 10/1996 |

OTHER PUBLICATIONS

Office Action issued in connection with corresponding EP Application No. 14173590.2 dated Oct. 31, 2016.

* cited by examiner

Fig. 7

POWER PLANT WITH INTEGRATED FUEL GAS PREHEATING

CROSS-REFERENCE TO RELATED APPLICATIONS

This application claims priority to European application 13175484.8 filed Jul. 8, 2013, the contents of which are hereby incorporated in its entirety.

TECHNICAL FIELD

The invention refers to a combined cycle power plant with integrated fuel gas preheating. The invention additionally refers to a method for operating a combined cycle power plant with integrated fuel gas preheating.

BACKGROUND OF THE DISCLOSURE

A CCPP (combined cycle power plant) is a power plant in combination of a gas turbine and a steam turbine with a high thermal efficiency so constructed as to lead high temperature exhaust gas from the gas turbine to a heat recovery steam generator (HRSG) and to generate steam by heat energy retained in the exhaust gas. This steam enables the power generation by the steam turbine, and coupled with power generated by the gas turbine, it is possible to improve thermal efficiency equivalent to thermal energy retained in exhaust gas compared with the independent power generation by a gas turbine.

For improving thermal efficiency of a CCPP, it is most effective to increase the hot gas temperature at the inlet of gas turbine to a higher temperature. However, even with the latest material and combustion technology, the hot gas temperatures are limited due to life time and emission reasons. To further increase the efficiency of CCPPs fuel gas preheating has been proposed.

The EP0931911 A2 describes the extraction of high pressure feed water upstream of a high pressure drum to preheat the fuel gas. The cold HP water is then sub-cooled and discharged to the main condenser.

The use of such fuel gas preheating systems improves the overall efficiency. However, it incurs mayor energy losses because high grade heat from a high pressure level is used.

The DE 10 2007 054 467 A1 describes a stepwise preheating using different heat sources from the intermediate pressure and low pressure level of the water steam cycle. After extracting heat the water used for preheating is returned to the low pressure system of the HRSG. The system described in DE 10 2007 054 467 A1 can lead to improved efficiency but is complex and expensive. In addition all return streams lead to the low pressure system thereby incurring corresponding losses.

SUMMARY OF THE DISCLOSURE

The object of the present disclosure is to propose a CCPP (combined cycle power plant) with a fuel gas preheating which effectively uses heat from the water steam cycle to achieve high plant efficiency and a minimum power loss due to fuel gas preheating.

According to one embodiment such a CCPP comprises a gas turbine, and a water steam cycle with a steam turbine, and a HRSG (heat recovery steam generator) with at least two pressure levels. It further comprises a fuel gas preheating for preheating the fuel of the gas turbine with a first heat exchanger for preheating the fuel gas to a first elevated temperature and a second heat exchanger for further preheating the fuel gas to a second elevated temperature. The first heat exchanger uses heat extracted from a lower pressure level of the water steam cycle, and a second heat exchanger uses heat extracted from the highest pressure level of the water steam cycle. To this end the first heat exchanger for preheating the fuel gas to the first elevated temperature is connected to a feed water line from a pressure level of the HRSG, which is below the highest HRSG pressure level, for feeding feed water into the first heat exchanger. The second heat exchanger for further preheating the fuel gas to the second elevated temperature is connected to the high pressure feed water with the highest pressure level of the HRSG for feeding high pressure feed water to the second heat exchanger.

The proposed fuel preheating leads to noticeable advantages over the prior art. First of all, the use of two heat sources with different temperatures leads to an increased efficiency. Further, the re-introduction of the return water into the feed water system reduces the total pressure losses incurred on the water side due to the fuel preheating.

Due to the use of two stage pre-heaters the size of the heat exchanger operating at the high pressure level can be reduced. The first heat exchanger has a lower design pressure thereby reducing the cost.

Because water leaving the fuel gas preheater is reintroduced to the feed water system the size of the feed water pump for the respective pressure level into which the water is returned can be reduced.

By using a two stage fuel pre-heater the fuel can economically be preheated to higher temperatures. The fuel gas can be preheated to a temperature in the range of for example 270 to 350° C. In particular it can be preheated to a temperature in the range of for example 290 to 310° C.

The use of water for preheating is thermodynamically more efficient than the use of steam. Further it allows the use of smaller heat exchangers.

In an embodiment of the CCPP the first heat exchanger is connected to a low pressure feed water line or to a medium pressure feed water line of the HRSG for preheating the fuel gas to the first elevated temperature. The second heat exchanger for fuel preheating is connected to the exit of the economizer of the HRSG using high pressure feed water to preheat the fuel gas to the second elevated temperature. The first heat exchanger can for example be connected to the low pressure feed water line or to the medium pressure feed water line downstream of the economizer. It can also for example be connected to the feed water lines in the middle of the economizer.

In this context the expression feed water line can be used for the lines for feeding water into the drums of the HRSG. For each pressure level a HRSG typically comprises a feed water supply with an economizer for preheating the feed water, a drum, an evaporator, and a superheater.

According to a further embodiment of the CCPP a booster pump is connected to a water outlet of the second heat exchanger to re-pressurize the feed water leaving the second heat exchanger to the inlet pressure of the high pressure economizer.

Alternatively or in combination the water outlet of the second heat exchanger can be connected to feed water line of a lower pressure level of the HRSG or to a drum of a lower pressure level of the HRSG. For a HRSG with three pressure levels, i.e. a low, medium, and high pressure level the water outlet of the second heat exchanger can for example be connected to the medium pressure feed water line or to the low pressure feed water line.

According to yet a further embodiment of the CCPP a booster pump is connected to the water outlet of the first heat exchanger to re-pressurize the feed water leaving the first heat exchanger to the pressure level of the feed water used for the first heat exchanger.

Alternatively or in combination the water outlet of first heat exchanger is connected to the next lower feed water line or to a drum of the next lower pressure level.

For a HRSG with three pressure levels the first heat exchanger can be connected to the medium pressure feed water line, for example downstream of the economizer. The outlet of the first heat exchanger can be connected to a booster pump that re-pressurize the feed water leaving the first heat exchanger to the pressure level of the medium pressure feed water for feeding the return water back into the medium pressure economizer.

The water outlet of the first heat exchanger can also be connected to the feed water line or to a drum of the next lower pressure level, i.e. the low pressure feed water line or drum.

According to one embodiment the water steam cycle comprises a low pressure level, a medium pressure level and a high pressure level. In this plant the first heat exchanger for preheating fuel gas is connected to the exit of a low pressure economizer or the exit of a medium pressure economizer and the second heat exchanger for preheating fuel gas is connected to the exit of a high pressure economizer.

The typical pressure range for the high pressure level is 130 to 250 bar, preferably 150 to 220 bar at base load operation. For the medium pressure level the typical pressure range is 30 bar to 100 bar, preferably 50 to 80 bar at base load operation.

According to a further embodiment of a CCPP with a HRSG having three pressure levels the first heat exchanger for preheating the fuel gas to the first elevated temperature is connected to the low pressure economizer or to the medium pressure economizer (31), and the second heat exchanger for further preheating the fuel gas to the second elevated temperature is connected to the high pressure economizer.

Alternatively or in combination the exit of the second heat exchanger can be connected to the inlet of an intermediate pressure drum or to the inlet of a low pressure drum.

According to a further embodiment of a combined cycle power with a HRSG having three pressure levels the exit of the second heat exchanger can be connected to the inlet of the high pressure economizer or to middle of the high pressure economizer. Typically a booster pump can be used to re-pressurize the water leaving the second heat exchanger to feed it back into the high pressure economizer.

According to a further embodiment of a combined cycle it comprises a flash tank connected to the water outlet of the second heat exchanger. In the flash tank the pressure is lowered by flashing the inlet water into the tank and thereby releasing steam. The flashed steam can be used in steam turbine to produce power and the remaining water returned to a feed water system of the HRSG at a suitable pressure vessel. For this the water outlet of the flash tank can be connected to the feed water system of the water steam cycle, and the steam outlet of the flash tank can be connected to the steam turbine via a steam line. The use of a flash tank can be considered if the water leaving the second heat exchanger is not re-pressurized but returned to a feed water system at a lower pressure level. If the pressure of the water leaving second heat exchanger is much higher than the pressure level of the feed water system's pressure to which it is added and its temperature still above the boiling temperature at the feed water system pressure use of flash tank can be advantageous. The remaining heat in the return water can be used for power production and the water is available at the required pressure.

The flash tank can for example be connected to a medium pressure or low pressure inter-stage steam feed of the steam turbine.

The fuel preheating can be arranged and used for preheating the fuel gas of the gas turbine of the CCPP. Optionally the HRSG can comprise a supplementary firing. An optional separate fuel gas preheating can be arranged for preheating the fuel of the supplementary firing or one fuel gas preheating can be provided which has sufficient capacity to preheat the fuel for the gas turbine and the supplementary firing. Fuel gas preheating for the supplementary firing can increase the net efficiency of the plant operating with supplementary firing but leads to additional cost and complexity of the plant. Its application needs to be carefully evaluated based on the expected operating time and regime with supplementary firing.

Typically the feed water is branched off to the fuel preheater from the HRSG feed water system after it is heated in an economizer in a line from the economizer to the drum of respective pressure level. Depending on the heat requirements and the temperature level of the feed water the line from feed water system to heat exchanger for fuel gas preheating can be branched off in the middle of the economizer or even upstream of the economizer.

Besides the CCPP a method for operating such a CCPP is subject of the present disclosure. Such a method can be used for operating a CCPP comprising a gas turbine, a steam turbine, a water steam cycle with HRSG with at least two pressure levels, and a fuel gas preheating for preheating the fuel of the gas turbine. According to the proposed method the fuel is preheated to a first elevated temperature using feed water from a pressure level of the HRSG, which is below the highest HRSG pressure level, in a first heat exchanger. After passing through the first heat exchanger the fuel is further preheated to a second elevated temperature in a second heat exchanger using high pressure feed water with the highest pressure level of the HRSG. The high pressure feed water is branched off from the HRSG feed water system and fed to the second heat exchanger.

According to one embodiment of the method the HRSG is operated with three pressure levels. Low pressure feed water or medium pressure feed water is fed to the first heat exchanger for preheating the fuel gas to the first elevated temperature, and in that high pressure feed water is heated in a high pressure economizer, and at least part of the heated high pressure feed water is fed into the second heat exchanger for preheating the fuel gas to the second elevated temperature.

According to a further embodiment of the method the water leaving the second heat exchanger is returned into the feed water system of a lower pressure level. During low load operation of the gas turbine a medium pressure feed water control valve, which controls the feed water flow from the economizer to the drum in the respective pressure level of the HRSG, is closed. The water flowing through the economizer can be fed to the first heat exchanger. At the same time a second heat exchanger control valve, which controls the water flow through the second heat exchanger, is used to control the water level of the drum into which the high pressure return water is returned. In this operating mode the fuel gas temperature after the second heat exchanger cannot be controlled to the design level but is a result of the available heat provided with the resulting water flow. The resulting temperature control is also called sliding temperature control.

At high part load operation and base load operation of the gas turbine the medium pressure feed water control valve is at least partly open and used to control the water level of the drum. A second heat exchanger control valve can be used to control the temperature to which the fuel gas is preheated by controlling the feed water flow through the second heat exchanger.

According to another embodiment of the method the water discharged from the second heat exchanger is re-pressurize by a booster pump to the inlet pressure of the high pressure economizer. Alternatively the water discharged from the second heat exchanger is fed to a feed water line or to a drum of a lower pressure level of the HRSG.

The method can be used for preheating the fuel of the gas turbine. In addition or combination it can be used for preheating fuel gas of a supplementary firing of the HRSG.

Typically two stage fuel preheating is used for fuel gas; however it can also be used for liquid fuel.

BRIEF DESCRIPTION OF THE DRAWINGS

The disclosure, its nature as well as its advantages, shall be described in more detail below with the aid of the accompanying schematic drawings. Referring to the drawings.

DETAILED DESCRIPTION

Figure 1:
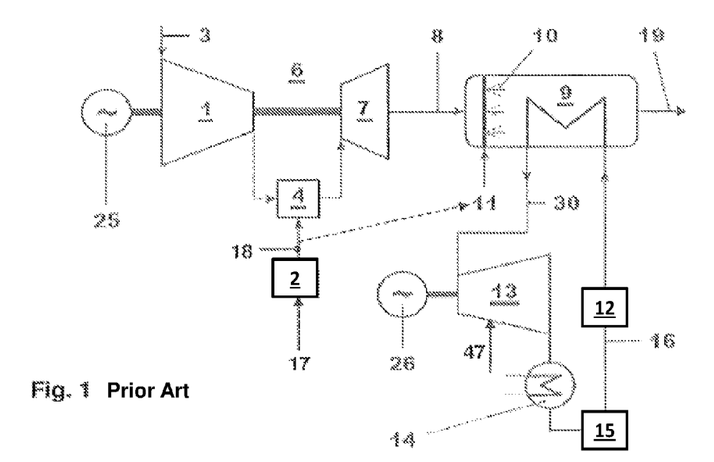
FIG. 1 schematically shows a CCPP with a gas turbine, a HRSG with supplementary firing, and fuel gas preheating.

A power plant for execution of the proposed method comprises a conventional CCPP, and a fuel preheater 2. Optionally the HRSG can be equipment a supplementary firing 10, A typical arrangement with fuel gas preheating is shown in FIG. 1. A gas turbine 6, which drives a first generator 25, is supplied with compressor inlet gas 3, and fuel 17. The compressor inlet gas 3 is compressed in the compressor 1 and the fuel 17 is heated to supply preheated fuel 18 in the fuel preheater 2. The compressed gas is used for combustion of preheated fuel 18 in a combustor 4, and pressurized hot gasses expand in a turbine 7. The gas turbine's 6 main outputs are electric power, and hot flue gasses 8.

The gas turbine's hot flue gasses 8 pass through a HRSG 9, which generates steam for a steam turbine 13. In the HRSG 9 or the flue gas duct from the gas turbine 6 to the HRSG 9 a supplementary firing 10 can optionally be integrated. The supplementary firing 10 is supplied with fuel 11. Optionally preheated fuel 18 can be supplied to the supplementary firing 10.

The steam turbine 13 is either arranged as a single shaft configuration with the gas turbine 6 and the first generator 25 (not shown), or is arranged as a multi shaft configuration to drive a second generator 26. The steam leaving the steam turbine 13 is condensed in the condensator 14. The condensate is collected in the feed water tank 15, re-pressurised by a feed water pump 12 and returned to the HRSG 9. In FIG. 1 only one feed water pump 12, one line for feed water 16, and one steam turbine 13 are shown.

The steam cycle is simplified and shown schematically without different steam pressure levels, feed water pumps, etc. Depending on the HRSG 9 design the feed water is pressurized to two, three or more pressure levels. Accordingly the number of feed water pumps feed water supply lines, and steam turbine will increase to two, three or a higher number. Examples with two and three pressure levels are shown in more detail in the subsequent Figures.

Different exemplary embodiments of the HRSG 9 with fuel preheater 2 are shown in FIGS. 2 to 6. For simplification no subsequent firing is shown in these Figures and the steam turbines with different pressure levels and additional feed lines are omitted.

Figure 2:
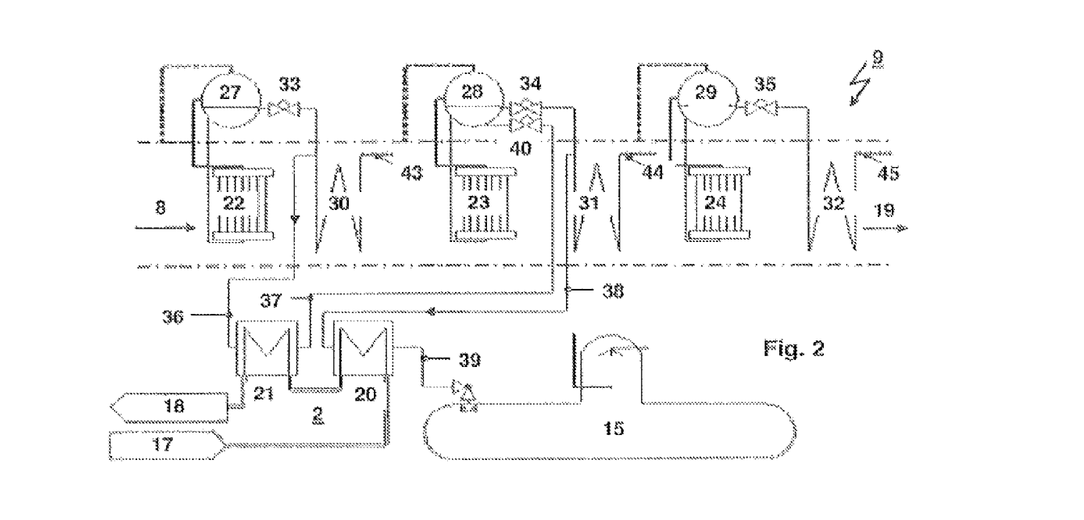
FIG. 2 schematically shows a HRSG with three pressure levels and fuel gas preheater.

The embodiment of FIG. 2 shows a HRSG with three pressure levels (low, medium and high pressure) and a fuel preheater 2. The hot flue gases from the gas turbine 8 flow through the HRSG 9. In the schematic the hot flue gases pass through a high pressure evaporator 22, a high pressure economizer 30, a medium pressure evaporator 23, a medium pressure economizer 31, and a low pressure evaporator 24, a low pressure economizer 32. Typically a superheater is arranged upstream of each evaporator 22, 23, 24 in the hot flue gas 8 flow path. After the useful heat is extracted from the flue gas it leaves the HRSG 9 as flue gas to the stack 19.

High pressure feed water is supplied to the high pressure economizer 30 via a high pressure feed water line 43, medium pressure feed water is supplied to the medium pressure economizer 31 via a medium pressure feed water line 44, and low pressure feed water is supplied to the low pressure economizer 32 via a low pressure feed water line 45. The flow of low pressure feed water to the low pressure drum 29 is controlled by a low pressure feed water control valve 35. The flow of medium pressure feed water to the medium pressure drum 28 is controlled by a medium pressure feed water control valve 34, and the flow of high pressure feed water to the high pressure drum 27 is controlled by a high pressure feed water control valve 33.

Water from the low pressure drum 29 is evaporated in the low pressure evaporator 24 and returned as steam to the low pressure drum 29. Water from the medium pressure drum 28 is evaporated in the medium pressure evaporator 23 and returned as steam to the medium pressure drum 28, and water from the high pressure drum 27 is evaporated in the high pressure evaporator 22 and returned as steam to the high pressure drum 27. The steam of each respective drum 27, 28, 29 is fed to respective super heaters (not shown) and further to the steam turbine 13, respectively to corresponding low, medium and high pressure steam turbines.

For fuel preheating medium pressure feed water 38 is branched off from the medium pressure feed water line after it is heated in the medium pressure economizer 31 and feed into the first heat exchanger 20 of the fuel preheater 2 to preheat the cold fuel 17 to a first temperature level. The medium pressure return water 39 leaving the first heat exchanger 20 is discharged to the feed water tank 15. The pressure in first heat exchanger 20 can for example be maintained by an orifice or control valve at the discharge into the feed water tank 15.

High pressure feed water 36 is branched of the high pressure feed water line after it is heated in the high pressure economizer 30. The branched off high pressure feed water 36 is fed into the second heat exchanger 21 of the fuel preheater 2 to further preheat the fuel to a second temperature level. The high pressure return water 37 leaving the second heat exchanger 21 is fed to the medium pressure drum 28 thus further utilizing its high pressure level and remaining heat in the water steam cycle. The heat release in the second heat exchanger 21 can be controlled by controlling the water flow through the second heat exchanger 21. In the example shown the water flow is controlled by the second heat exchanger control valve 40.

Figure 3:
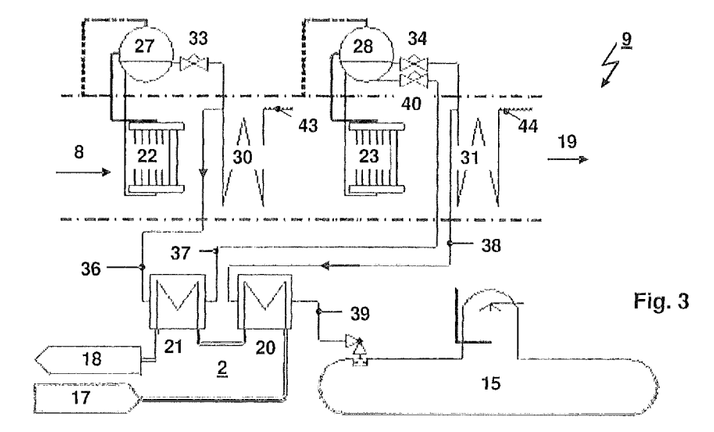
FIG. 3 schematically shows a HRSG with two pressure levels and fuel gas preheater.

The schematic FIG. 3 is a simplification of a HRSG 9 with fuel preheater 2 based on FIG. 2. In this example the HRSG 9 has only two pressure levels. For cost reasons and simplification of the plant one pressure level is omitted. Based on FIG. 2 the low pressure level is omitted. The medium pressure level could also be called low pressure level; however the naming remains unchanged in this example. Based on FIG. 2 simply the low pressure economizer 32 with low pressure feed water line 45, low pressure feed water control valve 35 as well as low pressure drum 29 and low pressure evaporator 24 are omitted. The flue gas to the stack 19 is released from the HRSG 9 downstream of the medium pressure economizer 31.

Figure 4:
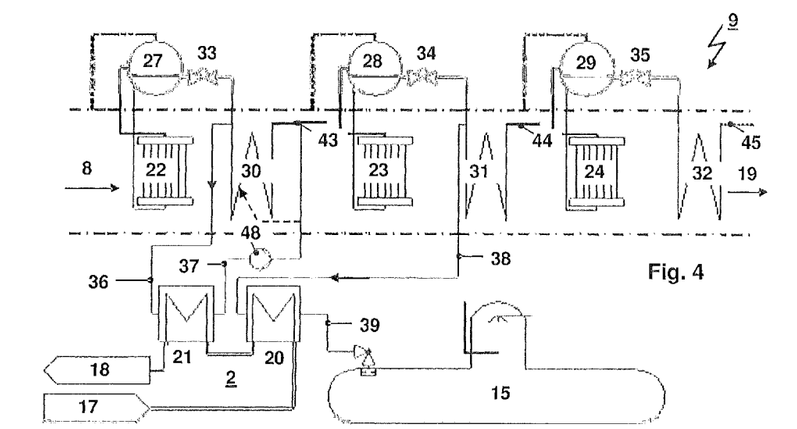
FIG. 4 schematically shows a HRSG with three pressure levels, fuel gas preheater and a booster pump to re-pressurize the return water from second heat exchanger of the fuel gas preheater to the high pressure feed water of the HRSG.

FIG. 4 schematically shows another example of a HRSG 9 with three pressure levels. This example is a modification based on the arrangement of FIG. 2. Instead of feeding the high pressure return water 37 leaving the second heat exchanger 21 to the medium pressure drum 28 it is re-pressurized in by booster pump 48 and returned to the high pressure feed water line 43 upstream of the high pressure economizer 30. Thereby the high pressure feed water flow coming from the high pressure feed water pump can be reduced and the high pressure level and remaining heat of the return water from the second heat exchanger 21 can be efficiently used. Also in this example the heat release in the second heat exchanger 21 can be controlled by controlling the water flow through the second heat exchanger 21. In the example shown the water flow is controlled by controlling the booster pump 48, e.g. with a variable speed drive.

Figure 5:
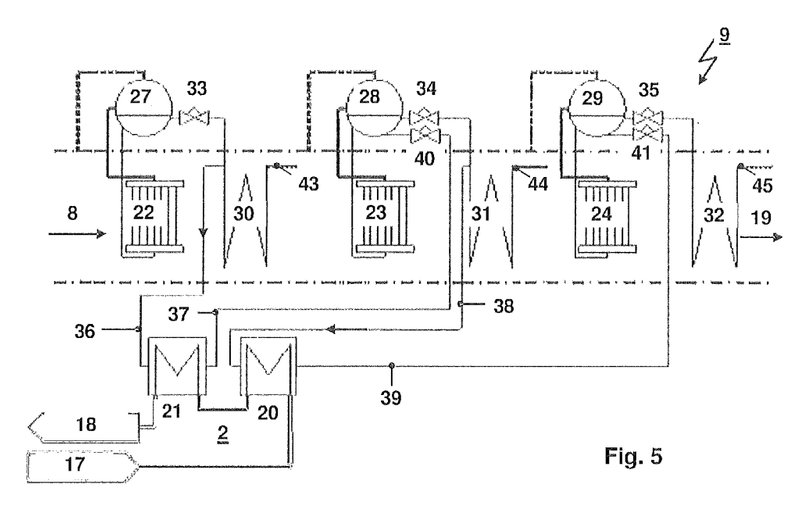
FIG. 5 schematically shows a HRSG with three pressure levels, fuel gas preheater and release of the first and second heat exchanger outlet water to the respective next lower feed water pressure level of the HRSG.

FIG. 5 schematically shows another example with a modification based on FIG. 2. In this example the medium pressure return water 39 leaving the first heat exchanger 20 is not discharged to the feed water tank 15. Here the medium pressure return water 39 is fed to the low pressure drum 29 thus using its pressure level and remaining heat. The heat release in the first heat exchanger 20 can be controlled by controlling the water flow through the first heat exchanger 20. In the example shown the water flow is controlled by the first heat exchanger control valve 41.

Figure 6:
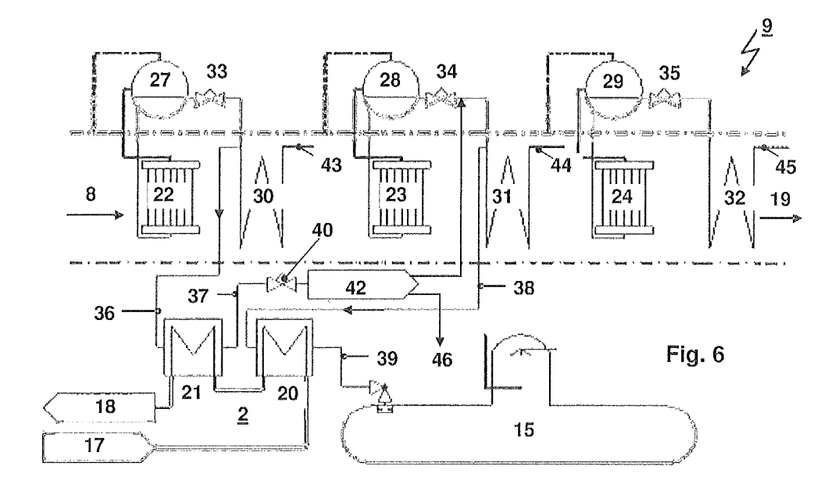
FIG. 6 schematically shows a HRSG with three pressure levels, fuel gas preheater and a flash tank to generate steam from the return water of the second heat exchanger.

FIG. 6 schematically shows yet another example of a HRSG 9 with three pressure levels, and a fuel preheater 2. It shows a modification based on the example of FIG. 2. Instead of feeding the high pressure return water 37 leaving the second heat exchanger 21 to the medium pressure drum 28 it is discharged into a flash tank 42 to generate steam from the return water 37 of the second heat exchanger 21. The steam can be fed via a flash steam line 46 to the steam turbine 13. The remaining water can be fed back into the medium pressure feed water line 44. To control the second heat exchanger 21 a second heat exchanger control valve 40 is arranged upstream of the flash tank 42.

Figure 7:
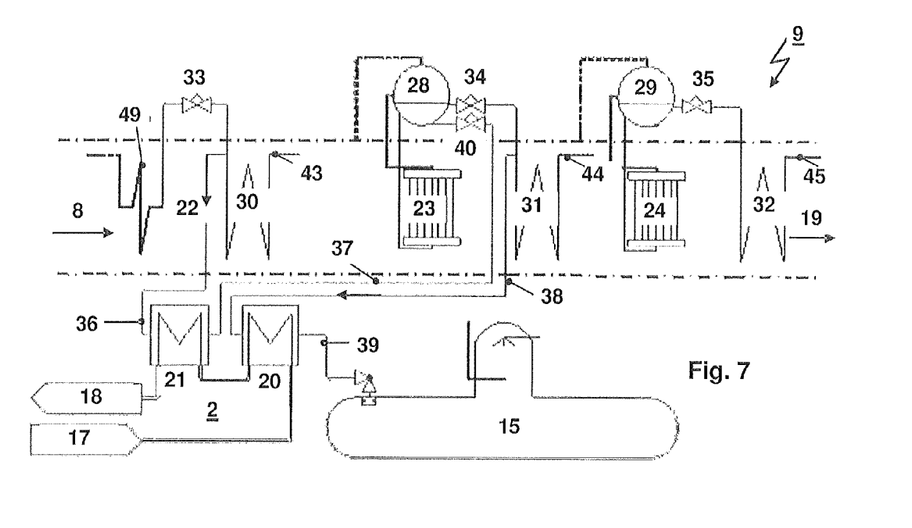
FIG. 7 schematically shows a HRSG with three pressure levels, a once through steam generator at high pressure and fuel gas preheater.

FIG. 7 schematically shows another example of a HRSG 9 with three pressure levels, and a fuel preheater 2. It shows a modification based on the example of FIG. 2. The steam generator of the high pressure level does not comprise an evaporator, boiler and super heater. Instead, it comprises a once through steam generator 49 at high pressure level.

A once through steam generator can also be used for the medium and low pressure level and in any combination of pressure levels.

All the explained advantages are not limited to the specified combinations but can also be used in other combinations or alone without departing from the scope of the disclosure. Other possibilities are optionally conceivable, for example, for the return water from the first heat exchanger can also be supplied to a flash tank for producing low pressure steam for a low pressure steam turbine.

The invention claimed is:

1. A combined cycle power plant (CCPP) comprising:
    a gas turbine, a water steam cycle with a steam turbine and a heat recovery steam generator (HRSG), and a fuel preheater for preheating fuel for the gas turbine, wherein the fuel preheater comprises:
    a first heat exchanger for preheating the fuel to a first temperature, by extracting heat from water at a first pressure from a first feed water system of the HRSG;
    a second heat exchanger for further preheating the fuel to a second temperature, by extracting heat from water at a second pressure from a second feed water system of the HRSG, wherein the second temperature is higher than the first temperature and the second pressure is higher than the first pressure;
    a return water feed line connected between the second heat exchanger and the first feed water system for feeding return water from the second heat exchanger to the first feed water system; and
    a control valve of the second heat exchanger in the return water feed line for controlling water flow through the second heat exchanger.

2. The CCPP according to claim 1, wherein the first heat exchanger is connected to a feed water line of the first feed water system, and in that the second heat exchanger is connected to a feed water line of the second feed water system.

3. The CCPP according to claim 1 wherein the first heat exchanger is connected to an exit of an economizer of the first feed water system.

4. The CCPP according to claim 1, wherein the second heat exchanger is connected to an exit of an economizer of the second feed water system.

5. The CCPP according to claim 1, wherein the return water feed line of the second heat exchanger is connected to a pressure drum of the first feed water system.

6. A method of operating a combined cycle power plant (CCPP) having a gas turbine, a water steam cycle with a steam turbine and a heat recovery steam generator (HRSG), and a fuel preheater for preheating fuel for the gas turbine, the method comprising:
    preheating the fuel using a first heat exchanger to a first temperature by extracting heat from water at a first pressure from a first feed water system of the HRSG;
    further preheating the fuel to a second temperature in a second heat exchanger by extracting heat from water at a second pressure from a second feed water system of the HRSG, wherein the second temperature is higher than the first temperature and the second pressure is higher than the first pressure;

feeding return water from the second heat exchanger to the first feed water system using a return water feed line connected between the second heat exchanger and the first feed water system; and controlling water flow through the second heat exchanger using a control valve of the second heat exchanger in the return water feed line.

7. The method of operating a CCPP according to claim 6, wherein the HRSG is operated with three pressure levels, and feed water from an economizer of the first feed water system is fed to the first heat exchanger for preheating the fuel, and in that feed water from an economizer of the second feed water system is fed into the second heat exchanger for preheating the fuel.

8. The method of operating a CCPP according to claim 6, comprising using the control valve of the second heat exchanger to control a water level of a drum of the first feed water system into which the return water from the second heat exchanger is returned.

9. The method of operating a CCPP according to claim 6, comprising controlling a water level of a drum of the first feed water system using a first feed water control valve, and using the control valve of the second heat exchanger to control the second temperature by controlling the water flow through the second heat exchanger.

\* \* \* \* \*